United States Patent
Minnen et al.

(10) Patent No.: US 12,026,925 B2
(45) Date of Patent: *Jul. 2, 2024

(54) CHANNEL-WISE AUTOREGRESSIVE ENTROPY MODELS FOR IMAGE COMPRESSION

(71) Applicant: Google LLC, Mountain View, CA (US)

(72) Inventors: David Charles Minnen, Mountain View, CA (US); Saurabh Singh, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,292

(22) Filed: Sep. 5, 2023

(65) Prior Publication Data

US 2023/0419555 A1 Dec. 28, 2023

Related U.S. Application Data

(63) Continuation of application No. 18/088,283, filed on Dec. 23, 2022, now Pat. No. 11,783,511, which is a
(Continued)

(51) Int. Cl.
*G06T 9/00* (2006.01)
*G06F 17/18* (2006.01)
(Continued)

(52) U.S. Cl.
CPC .............. *G06T 9/002* (2013.01); *G06F 17/18* (2013.01); *G06N 3/045* (2023.01); *G06N 3/08* (2013.01)

(58) Field of Classification Search
CPC ....... G06T 9/002; G06F 17/18; G06N 3/0454; G06N 3/08; G06N 3/088
See application file for complete search history.

(56) References Cited

U.S. PATENT DOCUMENTS 11,057,634 B2 * 7/2021 Schroers ................. G06N 3/045
11,184,615 B2 * 11/2021 Zhou ...................... H04N 19/13
(Continued)

FOREIGN PATENT DOCUMENTS

WO WO 2020068498 4/2020
WO WO 2020237136 11/2020

OTHER PUBLICATIONS

Alvarez-Mesa et al., "Parallel Video Decoding In The Emerging HEVC Standard," Proceedings of Int. Conf. on Acoustics, Speech and Signal Processing, 2012, 5 pages.
(Continued)

*Primary Examiner* — Lewis G West
(74) *Attorney, Agent, or Firm* — Fish & Richardson P.C.

(57) ABSTRACT

Methods, systems, and apparatus, including computer programs encoded on a computer storage medium, for channel-wise autoregressive entropy models. In one aspect, a method includes processing data using a first encoder neural network to generate a latent representation of the data. The latent representation of data is processed by a quantizer and a second encoder neural network to generate a quantized latent representation of data and a latent representation of an entropy model. The latent representation of data is further processed into a plurality of slices of quantized latent representations of data wherein the slices are arranged in an ordinal sequence. A hyperprior processing network generates a hyperprior parameters and a compressed representation of the hyperprior parameters. For each slice, a corresponding compressed representation is generated using a corresponding slice processing network wherein a combination of the compressed representations form a compressed representation of the data.

18 Claims, 5 Drawing Sheets

Related U.S. Application Data continuation of application No. 17/021,688, filed on Sep. 15, 2020, now Pat. No. 11,538,197.

(51) Int. Cl.
   *G06N 3/045* (2023.01)
   *G06N 3/08* (2023.01)

(56) References Cited

U.S. PATENT DOCUMENTS

| | | | | |
|---|---|---|---|---|
| 2020/0027247 | A1* | 1/2020 | Minnen | G06N 20/00 |
| 2020/0160565 | A1* | 5/2020 | Ma | H04N 19/60 |
| 2020/0304147 | A1* | 9/2020 | Choi | G06N 3/04 |
| 2020/0351298 | A1* | 11/2020 | Paturi | G06N 5/04 |
| 2020/0372684 | A1* | 11/2020 | Wen | G06T 3/4053 |
| 2020/0374522 | A1* | 11/2020 | Zhou | H04N 19/124 |
| 2021/0152831 | A1* | 5/2021 | Liu | H04N 19/463 |
| 2021/0406765 | A1* | 12/2021 | Zhang | G06N 3/047 |
| 2022/0138991 | A1* | 5/2022 | Minnen | G06N 3/047 |
| | | | | 382/232 |
| 2022/0192578 | A1* | 6/2022 | Doidge | G16H 50/20 |
| 2022/0215594 | A1* | 7/2022 | Tackstrom | G06T 9/002 |
| 2022/0237740 | A1* | 7/2022 | Lu | H04N 19/126 |

OTHER PUBLICATIONS

Baig et al., "Learning To Inpaint For Image Compression," Advances in Neural Information Processing Systems, Nov. 10, 2017, pp. 1246-1255.

Balle et al., "End-To-End Optimization Of Nonlinear Transform Codes For Perceptual Quality," Picture Coding Symposium, Oct. 17, 2016, 5 pages.

Balle et al., "End-To-End Optimized Image Compression," 5th Int. Conf. on Learning Representations, Mar. 3, 2017, 27 pages.

Balle et al [online], "Variational Image Compression With A Scale Hyperprior," 6th Int. Conf. on Learning Representations, received from URL: <https://openreview.net/forum?id=rkcQFMZRb>, May 1, 2018, 23 pages.

Bellard [online], "BPG Image Format", retrieved on or before Jan. 30, 2017, retrieved from URL: <http://bellard.org/bpg/>, Jan. 30, 2017, 1 page.

Developers.google.com [online], "Compression techniques," Jan. 30, 2017, retrieved from URL: <http://developers.google.com/speed/webp/docs/compression>, 8 pages.

Grange et al., "An Overview of Core Coding Tools in the AV1 Video Codec," 2018, Jean-Marc Valin, 5 pages.

Iso.org, [online], "High Efficiency Video Coding and Media Delivery in Heterogeneous Environments—Part 2: High Efficiency Video Coding," retrieved on Oct. 4, 2021, retrieved from URL: <https://www.iso.org/standard/35424.html>, 3 pages.

Johnston et al., "Improved Lossy Image Compression With Priming And Spatially Adaptive Bit Rates For Recurrent Networks," 2018 IEEE Conference on Computer Vision and Pattern Recognition, 2018, 9 pages.

Kingma et al., "Adam: A Method For Stochastic Optimization," arXiv e-prints, 3rd Int. Conf. on Learning Representations, Jan. 30, 2017, 15 pages.

Klopp et al., "Learning A Code-Space Predictor By Exploiting Intra-Image-Dependencies," British Machine Vision Conference, 2018, 12 pages.

Kodak [online], "Kodak lossless true color image suite," retrieved from URL: <http://r0k.us/graphics/kodak/>, 3 pages.

Lee et al., "Context-Adaptive Entropy Model For End-To-End Optimized Image Compression," Int. Conf. on Learning Representations, May 6, 2019, 20 pages.

Li et al., "Learning Convolutional Networks For Content-Weighted Image Compression," 2018 IEEE Conference on Computer Vision and Pattern Recognition, 2017, 10 pages.

Mentzer et al., "Conditional Probability Models For Deep Image Compression," 2018 IEEE Conference on Computer Vision and Pattern Recognition, 2018, 9 pages.

Minnen et al., "Image-Dependent Local Entropy Models for Learned Image Compression," International Conference on Image Processing, May 31, 2018, 5 pages.

Minnen et al., "Joint Autoregressive And Hierarchical Priors For Learned Image Compression," Advances in Neural Information Processing Systems, Sep. 8, 2018, 22 pages.

Minnen et al., "Spatially Adaptive Image Compression Using A Tiled Deep Network," International Conference on Image Processing, Feb. 7, 2018, 5 pages.

Rippel et al., "Real-Time Adaptive Image Compression," Proc. Of Machine Learning Research, vol. 70, 2017, pp. 2922-2930.

Theis et al., "Lossy Image Compression With Compressive Autoencoders," 5th Int. Conf. on Learning Representations, Mar. 1, 2017, 19 pages.

Toderici et al., "Full Resolution Image Compression with Recurrent Neural Networks," IEEE Conference on Computer Vision and Pattern Recognition, 2017, 9 pages.

Van Den Oord et al., "Conditional Image Generation With PixelCNN Decoders," Advances in Neural Information Processing Systems, Jun. 18, 2016, pp. 4790-4798.

Wen et al., "Variational Autoencoder Based Image Compression With Pyramidal Features And Context Entropy Model," Workshop and Challenge on Learned Image Compression, Jun. 2019, 4 pages.

Wikipedia.com [online], "Advanced Video Coding," retrieved on Oct. 4, 2021, retrieved from URL: https://en.wikipedia.org/wiki/Advanced_Video_Coding, Jun. 2019, 21 pages.

www.iso.org [online], "Information technology—JPEG 2000 image coding system," 2000, retrieved from URL: < https://www.iso.org/standard/78321.html >, (abstract only), 3 pages.

Zamir, "Lattice Coding for Signals and Networks," A Structured Coding Approach to Quantization, Modulation and Multi-user Information Theory, Cambridge University, 2014, 39 pages.

Zhou et al., "Multi-Scale And Context-Adaptive Entropy Model For Image Compression," Workshop and Challenge on Learned Image Compression, Jun. 2019, 4 pages.

\* cited by examiner

CHANNEL-WISE AUTOREGRESSIVE ENTROPY MODELS FOR IMAGE COMPRESSION

CROSS-REFERENCE TO RELATED APPLICATIONS

This application is a continuation application of, and claims priority to, U.S. patent application Ser. No. 18/088,283, filed on Dec. 23, 2022, which is a continuation application of, and claims priority to, U.S. patent application Ser. No. 17/021,688, now U.S. Pat. No. 11,538,197, filed on Sep. 15, 2020. The disclosures of the foregoing applications are incorporated herein by reference in their entirety for all purposes.

BACKGROUND

This specification relates to data compression.

Compressing data refers to determining a representation of the data that occupies less space in a memory and/or requires less bandwidth for transmission, e.g. over a network. Compressed data may be stored (e.g., in a logical data storage area or physical data storage device), transmitted to a destination over a communications network (e.g., the Internet), or used in any other manner. Generally, the data can be reconstructed (either approximately or exactly) from the compressed representation of the data.

SUMMARY

This specification describes how a system implemented as one or more computer programs on one or more computers in one or more locations that perform data compression and data decompression.

In general, one innovative aspect of the subject matter described in this specification can be embodied in methods that include the actions of processing data using a first encoder neural network to generate a latent representation of the data; processing the latent representation of data, comprising: processing the latent representation of data by a first quantizer to generate a quantized latent representation of data; and processing the latent representation of the data using a second encoder neural network to generate a latent representation of an entropy model, wherein the entropy model is defined by one or more probability distribution parameters characterizing one or more code symbol probability distributions; processing the quantized latent representation of data into a plurality of slices of quantized latent representations of data, wherein each slice of quantized latent representation of data is different from each other slice of quantized latent representation of data, and the slices are arranged in an ordinal sequence; generating, by a hyperprior processing network and from the latent representation of the entropy model, hyperprior parameters representing the probability distribution of the entropy model and a compressed representation of the hyperprior parameters; (sigma prime and mu prime); for each slice in the ordinal sequence of slices: receiving, by a first slice processing network, the hyperprior parameters representing the probability distribution of the entropy model and the first slice of quantized latent representation of data, and generating, by the first slice processing network, a compressed representation of the first slice, and a first augmented slice that represents the first slice of quantized latent representation of data and a latent residual prediction that is a prediction of a residual encoding and decoding error based on the hyperprior parameters; for each slice subsequent to the first slice in the ordinal sequence of slices; receiving, by a respective subsequent slice processing network, the hyperprior parameters representing the probability distribution of the entropy model and each respective augmented slice generated by each prior respective subsequent slice processing network and the first slice processing network, and generating, by the respective subsequent slice processing network, a compressed representation of the respective slice, a respective subsequent augmented slice that represents the respective subsequent slice of quantized latent representation of data and a respective latent residual prediction that is a prediction of a residual encoding and decoding error based on the hyperprior parameters and each prior subsequent augmented slice; and wherein a combination of the compressed representation of the first slice and each compressed representation of each respective slice form a compressed representation of the data.

Other embodiments of this aspect include corresponding systems, apparatus, and computer programs, configured to perform the actions of the methods, encoded on computer storage devices. These and other embodiments can each optionally include one or more of the following features.

Methods can further include generating, by the hyperprior processing network and from the latent representation of the entropy model, the hyperprior parameters comprises: processing the latent representation of the entropy model using a second quantizer to generate a quantized representation of the latent representation of the entropy model; processing the quantized representation of the latent representation of the entropy model using an encoder and based on a predetermined entropy model that specifies one or more predetermined probability distributions to generate a compressed representation of the hyperprior parameters; processing the compressed representation of the hyperprior parameters using a decoder to generate a decoded representations of two or more hyperprior parameters; processing each of the decoded representation of two or more hyperprior parameters using a corresponding decoder neural network to generate the two or more hyperprior parameters.

Methods can include generating, by the first slice processing network the first augmented slices comprises: processing the first slice of quantized latent representation of data using an encoder based on the hyperprior parameters to generate the compressed representation of the first slice; processing the compressed representation of the first slice using a decoder based on the hyperprior parameters to generate a decoded representation of the compressed representation of the first slice; processing the first slice of quantized latent representation of data and the hyperprior parameters using a latent residual prediction model to generate the latent residual prediction of the first slice; combining the latent residual prediction of the first slice and the decoded representation of the compressed representation of the first slice to generate the first augmented slice.

Methods can include generating, by each of the respective subsequent slice processing network, the respective subsequent augmented slice comprises: processing the respective subsequent slice of quantized latent representation of data using an encoder based on the hyperprior parameters and the prior respective subsequent augmented slice to generate the compressed representation of the subsequent slice; processing the compressed representation of the subsequent slice using a decoder based on the hyperprior parameters and the prior subsequent augmented slice to generate a decoded representation of the compressed representation of the respective subsequent slice; processing the respective subsequent slice of quantized latent representation of data, the hyperprior parameters and the prior subsequent augmented slice using a latent residual prediction model to generate the latent residual prediction of the respective subsequent slice; combining the latent residual prediction of the respective subsequent slice the decoded representation of the compressed representation of the respective subsequent slice to generate the respective augmented slice.

Methods can include processing the quantized latent representation of data by the latent residual prediction model that comprises a convolutional neural network model trained to predict the latent representation of data.

Methods can include generating a compressed representation of a respective slice of quantized latent representation of data using an encoder comprises arithmetic encoding of the slice of quantized latent representation using the two or more hyperprior parameters or the prior respective augmented slice.

Methods can include using the first and the second encoder neural network that comprises convolution neural network layers and data that comprises an image.

Particular embodiments of the subject matter described in this specification can be implemented so as to realize one or more of the following advantages. In learning-based image compression, image codecs are developed by optimizing a computational model to minimize a rate-distortion objective. The systems and methods described below realize three enhancements, channel-conditioning, latent residual prediction and round-based training that lead to network architectures with better rate-distortion performance than existing context-adaptive models. These enhancements also reduce serial processing. Implementations combining channel-conditioning, latent residual prediction, and round-based training can develop a neural image compression architecture that outperforms a corresponding context-adaptive model while minimizing serial processing.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a data compression system and a data decompression system. The compression system is configured to process input data (e.g., image data, audio data, video data, text data, or any other appropriate sort of data) to generate a compressed representation of the input data. The decompression system can process the compressed data to generate a (approximate or exact) reconstruction of the input data.

Generally, the compression and decompression systems may be co-located or remotely located, and compressed data generated by the compression system can be provided to the decompression system in any of a variety of ways. For example, the compressed data may be stored (e.g., in a physical data storage device or logical data storage area), and then subsequently retrieved from storage and provided to the decompression system. As another example, the compressed data may be transmitted over a communications network (e.g., the Internet) to a destination, where it is subsequently retrieved and provided to the decompression system.

In general, autoencoder based compression systems transforms pixels into a quantized latent representation suitable for compression by standard entropy coding techniques e.g., an arithmetic coding technique, a range coding technique, or a Huffman coding technique. In such systems, the compression and decompression system includes a plurality of parameters that are jointly adjusted to transform the latent representation of the input image back into pixels.

To compress the input data, the compression system maps the input data to a quantized latent representation as an ordered collection of "code symbols", e.g., a vector or matrix of code symbols. Each code symbol is drawn from a discrete set of possible code symbols, e.g., a set of integer values. The compression system compresses the code symbols by entropy encoding them using a conditional entropy model, i.e., an entropy model that depends on the input data. The conditional entropy model defines a respective code symbol probability distribution (i.e., probability distribution over the set of possible code symbols) corresponding to each code symbol in the ordered collection of code symbols representing the input data. The compression system then generates the compressed representation of the input data based on: (i) the compressed code symbols, and (ii) "side-information" characterizing the conditional entropy model used to compress the code symbols.

The decompression system can decompress the data by recovering the conditional entropy model from the compressed data, and using the conditional entropy model to decompress (i.e., entropy decode) the compressed code symbols. The decompression system can then reconstruct the original input data by mapping the code symbols back to a reconstruction of the input data.

Using a conditional entropy model that is adaptive and input data-dependent (rather than, e.g., a static, predetermined entropy model) can enable the input data to be compressed more effectively. These features and other features are described in more detail below.

Figure 1:
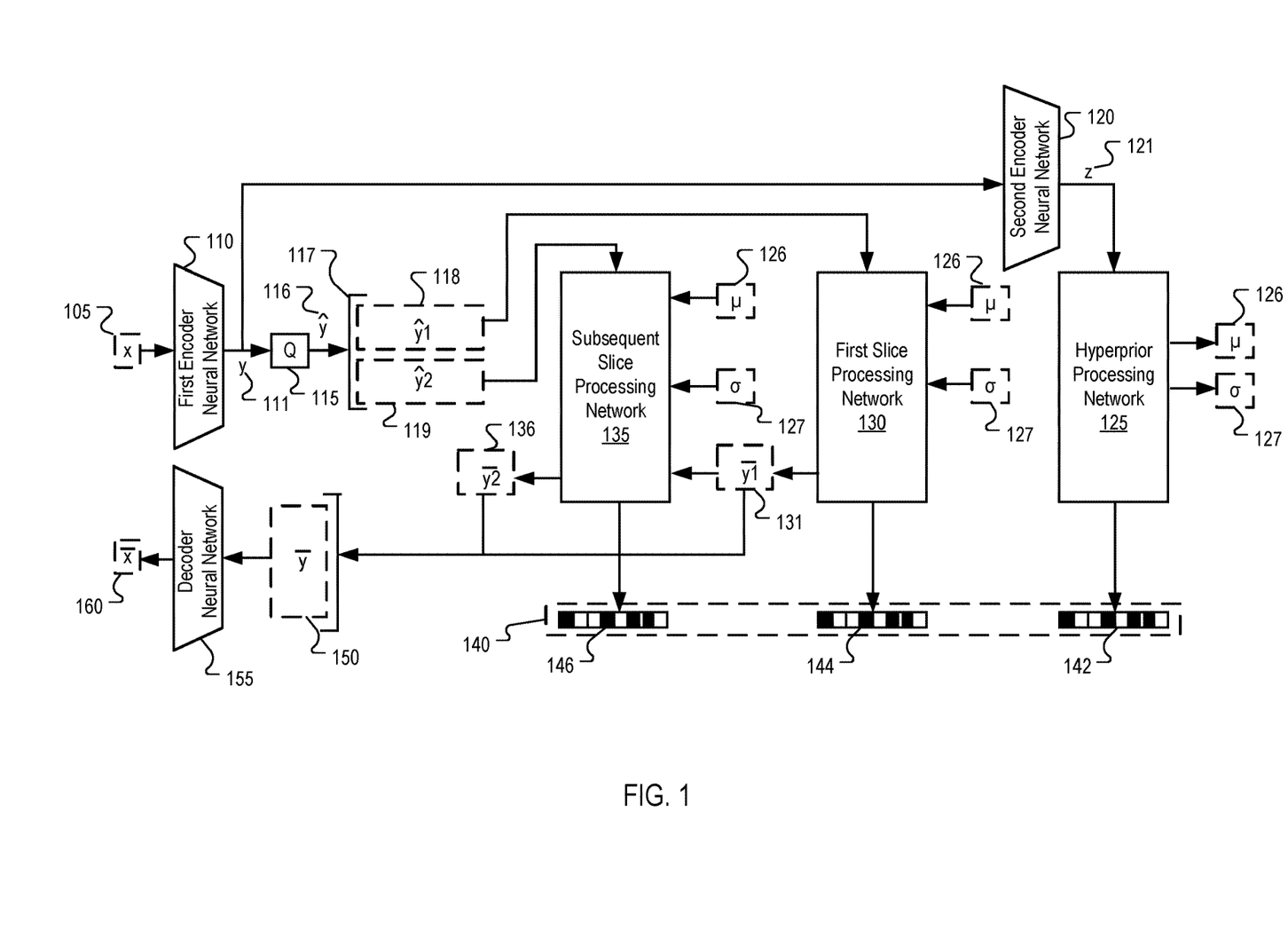
FIG. 1 is a block diagram of an example compression system.

FIG. 1 is a block diagram of an example compression system 100. The compression system 100 is an example system implemented as computer programs on one or more computers in one or more locations in which the systems, components, and techniques described below are implemented.

The compression system 100 processes the input data 105 to generate compressed data 140 representing the input data 105 using: (1) a first encoder neural network 110, (2) a second encoder neural network 120, (3) a hyperprior processing network 125, (4) a first slice processing network 130, (5) a plurality of subsequent slice processing networks 135. The networks used by the compression system 100 are jointly trained (along with neural networks used by the decompression system) using a rate-distortion objective function. Generally, each neural network described in this document can have any appropriate neural network architecture that enables it to perform its described function.

The first encoder neural network 110 is configured to process the input data 105 ($x$) to generate a latent representation 111 ($y$) of the input data 105. As used throughout this document, a "latent representation" of data refers to a representation of the data as an ordered collection of numerical values, e.g., a vector or matrix of numerical values. In one example, the input data may be an image, the first encoder neural network 110 may be a convolutional neural network, and the latent representation 111 of the input data may be a multi-channel feature map output by the final layer of the first encoder neural network 110. Generally, the latent representation 111 of the input data may be more compressible than the input data itself, and in some cases, may have a lower dimensionality than the input data.

To facilitate compression of the latent representation 111 of the input data using entropy encoding techniques, the compression system 100 quantizes the latent representation 111 of the input data using a quantizer Q 115 to generate an ordered collection of code symbols 116 ($\hat{y}$) also referred to as quantized latent representation of data. Quantizing a value refers to mapping the value to a member of a discrete set of possible code symbols. For example, the set of possible code symbols may be integer values, and the compression system 100 may perform quantization by rounding real-valued numbers to integer values.

The ordered collection of code symbols 116 ($\hat{y}$) (also referred to as quantized latent representation of data) is processed into a plurality of slices of quantized latent representations of data such that each slice of quantized latent representation of data is different from the other slices of quantized latent representation of data. In one example, the slices of the quantized latent representation of data are arranged in an ordinal sequence. For example, assume that the quantized latent representation of data is a matrix of dimension 600×200. Also assume that the number of slices as determined by the compression system configuration is 3. In such a scenario, one possible way of slicing the quantized latent representation of data is a matrix of size 600×200 is by generating three slices of dimension 200×200.

In some implementations, the ordered collection of code symbols 116 ($\hat{y}$) can have a dimension other than the 2D dimension (as shown in the example above). For example, assume that the ordered collection of code symbols 116 ($\hat{y}$) has a dimension [H×W×C]. In one example, the compression system 100 slice the quantized latent representation of data across the dimension C. For example, assume that the quantized latent representation of data is a matrix of dimension 600×200×2. Also assume that the number of slices as determined by the compression system configuration is 2. In such a scenario, one way of slicing the quantized latent representation of data is a matrix of size 600×200×2 is by generating two slices of dimension 600×200. In the present example, the number of slices as determined by the compression system configuration is 2 and the quantized latent representation of data 116 ($\hat{y}$) is processed into two slices: (1) a first slice of quantized latent representation of data 118 ($\hat{y1}$), and (2) a second slice of quantized latent representation of data 119 ($\hat{y2}$).

The compression system 100 uses the second encoder neural network 120 and the hyperprior processing network 125 to generate a conditional entropy model for entropy encoding the code symbols 116 ($\hat{y}$) representing the input data, as will be described in more detail below.

The second encoder neural network 120 is configured to process the latent representation 111 of the input data to generate a latent representation of an entropy model 121 ($z$) that characterizes an input data using the entropy model that will enable the code symbols 116 ($\hat{y}$) representing the input data to be efficiently compressed. In one example, the second encoder neural network 120 may be a convolutional neural network, and the latent representation of an entropy model 121 ($z$) may be a multi-channel feature map output by the final layer of the second encoder neural network 120.

The hyperprior processing network 125 is configured to receive as input the latent representation of the entropy model 121 ($z$) and generate as output hyperprior parameters mu 126 ($\mu$) and sigma 127 ($\sigma$) representing the probability distribution of the entropy model 121 ($z$) and a compressed representation of the hyperprior parameters 142.

Generally, the output of the hyperprior processing network 125 includes parameters that define the probability distribution of the conditional entropy model. In one example, the probability distribution of the conditional entropy model may be a Gaussian distribution (parameterized by mean and standard deviation parameters) convolved with a unit uniform distribution. The hyperprior processing network is further explained in detail with reference to FIG. 2.

Figure 2:
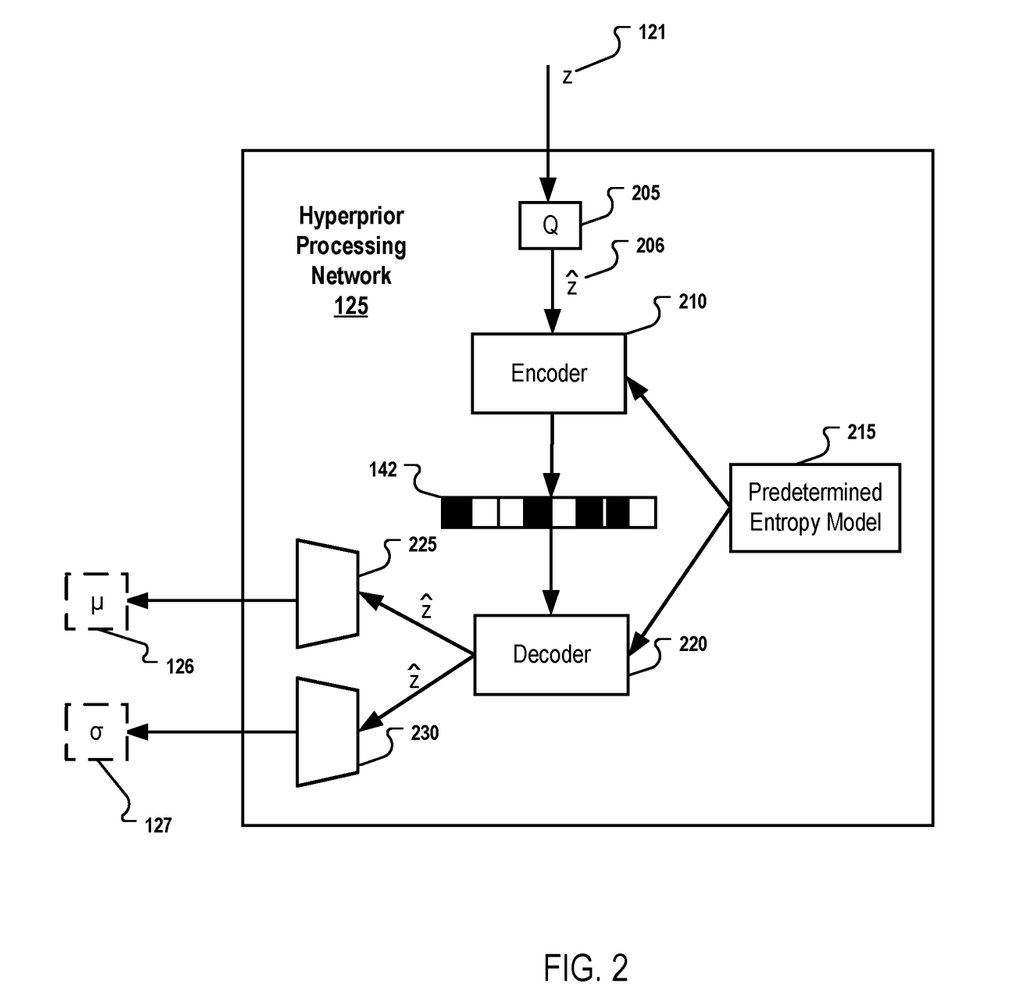
FIG. 2 is a block diagram of an example hyperprior processing network.

FIG. 2 is a block diagram of an example hyperprior processing network 125 used by the compression system 100. The hyperprior processing network 125 includes (1) a second quantizer 205, (2) an entropy encoder 210, (3) a predetermined entropy model 215, (4) an entropy decoder 220 and (5) two convolutional neural network blocks 225 and 230 that includes convolutional neural network layers.

The second quantizer 205 within the hyperprior processing network 125 is configured to quantize the latent representation of an entropy model 121 ($z$) and generate a quantized representation of the latent representation of the entropy model 206 ($\hat{z}$) which is an ordered collection of code symbols representing the latent representation of an entropy model 121 ($z$). The entropy encoder 210 within the hyperprior processing network 125 compresses the quantized representation of the latent representation of the entropy model 206 ($\hat{z}$) using a predetermined entropy model 215 that specifies one or more predetermined code symbol probability distributions to generate a compressed representation of the hyperprior parameters 142.

The entropy encoder 210 can implement any appropriate entropy encoding technique, e.g., an arithmetic coding technique, a range coding technique, or a Huffman coding technique. The compressed code symbols 134 may be represented in any of a variety of ways, e.g., as a bit string.

The entropy decoder 220 within the hyperprior processing network 125 is configured to process the compressed representation of the hyperprior parameters 142 to generate a decoded representations of the hyperprior parameters. The decoded representations of the hyperprior parameters is further provided as input to convolutional neural network blocks to generate the hyperprior parameters. In one example, the hyperprior parameters are probability distribution parameters such as mu 126 ($\mu$) and sigma 127 ($\sigma$) representing a Gaussian distribution that parameterizes the entropy model characterizing one or more code symbol probability distributions. In this example, the decoded representations of the hyperprior parameters is provided as input to two convolutional neural network blocks 225 and 230 that generate the probability distribution parameters mu 126 ($\mu$) and sigma 127 ($\sigma$).

In one example, the quantized representation of the latent representation of the entropy model 206 ($\hat{z}$) can be directly provided as input to the convolutional neural network blocks 225 and 230 thereby bypassing the entropy decoder 220. For example, during compression, they hyperprior processing network 125, can compress the quantized representation of the latent representation of the entropy model 206 ($\hat{z}$) using the entropy encoder 210 and provide the quantized representation of the latent representation of the entropy model 206 ($\hat{z}$) as inputs to the convolution neural network blocks 225 and 230 to generate the hyperprior parameters. However, during decompression and since the decompression system receives only the compressed data, the hyperprior processing network 125, can extract and process the compressed representation of the hyperprior parameters 142 using a entropy decoder 220 and provide the decoded representation of the hyperprior parameters to the convolutional neural network blocks.

Resuming the explanation of the compression system 100 with reference to FIG. 1, the first slice processing network 130 is configured to receive as input the hyperprior parameters (mu and sigma) representing the probability distribution of the entropy model generated using the hyperprior processing network 125 and the first slice of quantized latent representation of data 118 ($\overline{y1}$) and generate a compressed representation of the first slice 144, and a first augmented slice 131. The first slice processing network 130 is further explained with reference to FIG. 3.

Figure 3:
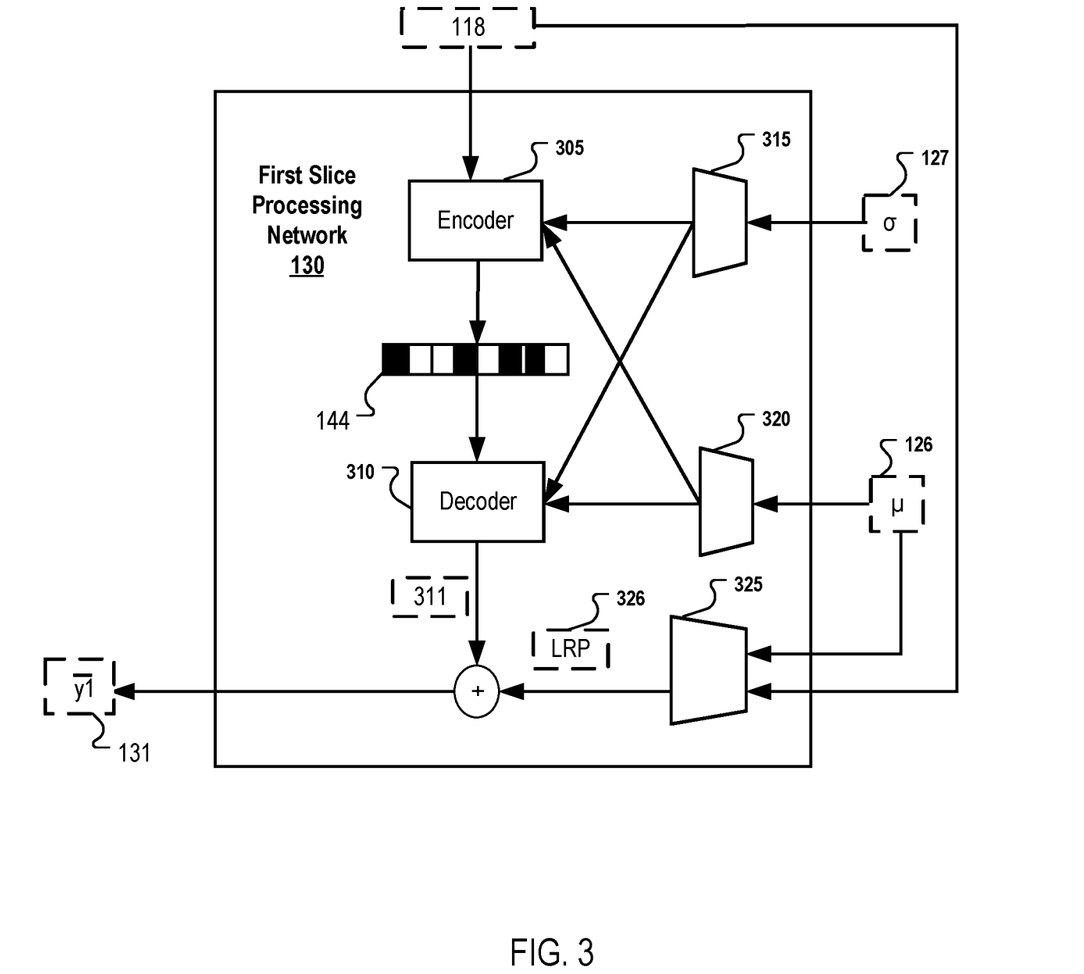
FIG. 3 is a block diagram of an example first slice processing network.

FIG. 3 is a block diagram of an example first slice processing network 130 used by the compression system 100. The first slice processing network 130 includes (1) an entropy encoder 305, (2) an entropy decoder 310 and (3) two convolutional neural network blocks 315 and 320 that includes convolutional neural network layers, and (4) a latent residual prediction model 325.

In one example, the convolutional neural network block 315 within the first slice processing network 130 is configured to receive as input, the hyperprior parameter sigma 127 ($\sigma$) that is generated by the hyperprior processing network 125 to generate as output, a representation of the hyperprior parameter sigma 127 ($\sigma$).

In another example, the convolutional neural network block 320 within the first slice processing network 130 is configured to receive as input, the hyperprior parameter mu 126 ($\mu$) that is generated by the hyperprior processing network 125 to generate as output, a representation of the hyperprior parameter mu 126 ($\mu$).

The entropy encoder 305 within the first slice processing network 130 compresses the first slice of the quantized latent representation of data 118 ($\overline{y1}$) using the representation of the hyperprior parameter sigma 127 ($\sigma$) and the representation of the hyperprior parameter mu 126 ($\mu$) to generate a compressed representation of the first slice 144. As mentioned before, the entropy encoder 305 can implement any appropriate entropy encoding technique, e.g., an arithmetic coding technique, a range coding technique, or a Huffman coding technique. The compressed representation of the first slice 144 may be represented in any of a variety of ways, e.g., as a bit string. In some implementations, the entropy encoder 305 within the first slice processing network 130, prior to compressing the first slice of the quantized latent representation of data 118 ($\overline{y1}$) can subtract mu 126 ($\mu$) from the first slice of the quantized latent representation of data 118 ($\overline{y1}$).

In general, autoencoder-based models learn to transform pixel values (x) into real-valued latents (y) that are quantized Q before they are losslessly compressed. This process leads to a residual error (r=y−Q[y]) in the latent space that manifests as extra distortion when Q[y] is transformed back into the pixel domain. The latent residual prediction model 325 within the first slice processing network 130 is configured to process the first slice of quantized latent representation of data 118 ($\overline{y1}$) and the hyperprior parameters mu 126 ($\mu$) to generate the latent residual prediction (LRP) 326 of the first slice of quantized latent representation of data.

In one example, the compressed representation of the first slice 144 is decoded using an entropy decoder 310 to generate a decoded representation 311 of the compressed representation of the first slice based on the hyperprior parameters mu 126 ($\mu$) and sigma 127 ($\sigma$). The decoded representation 311 and the latent residual prediction (LRP) 326 is further combined (e.g., summed or concatenated) to generate a first augmented slice 131 ($\overline{y1}$).

During decompression and since the decompression system receives only the compressed data, the latent residual prediction model 325 within the first slice processing network 130 is configured to process the decoded representation 311 instead of the first slice of quantized latent representation of data 118 ($\overline{y1}$) to generate the latent residual prediction (LRP) 326 of the first slice of quantized latent representation of data.

Coming back to FIG. 1, the subsequent slice processing network 135 is configured to receive as input the hyperprior parameters (mu and sigma) representing the probability distribution of the entropy model generated using the hyperprior processing network 125, the subsequent slice of quantized latent representation of data which in this case is the second slice 119 ($\overline{y2}$) and an augmented slice generated by a prior subsequent slice processing network which in this case is the first augmented slice 131 ($\overline{y1}$) and generate as output a compressed representation of the second slice 146, and a subsequent augmented slice 136. The subsequent slice processing network 135 is further explained with reference to FIG. 4.

Figure 4:
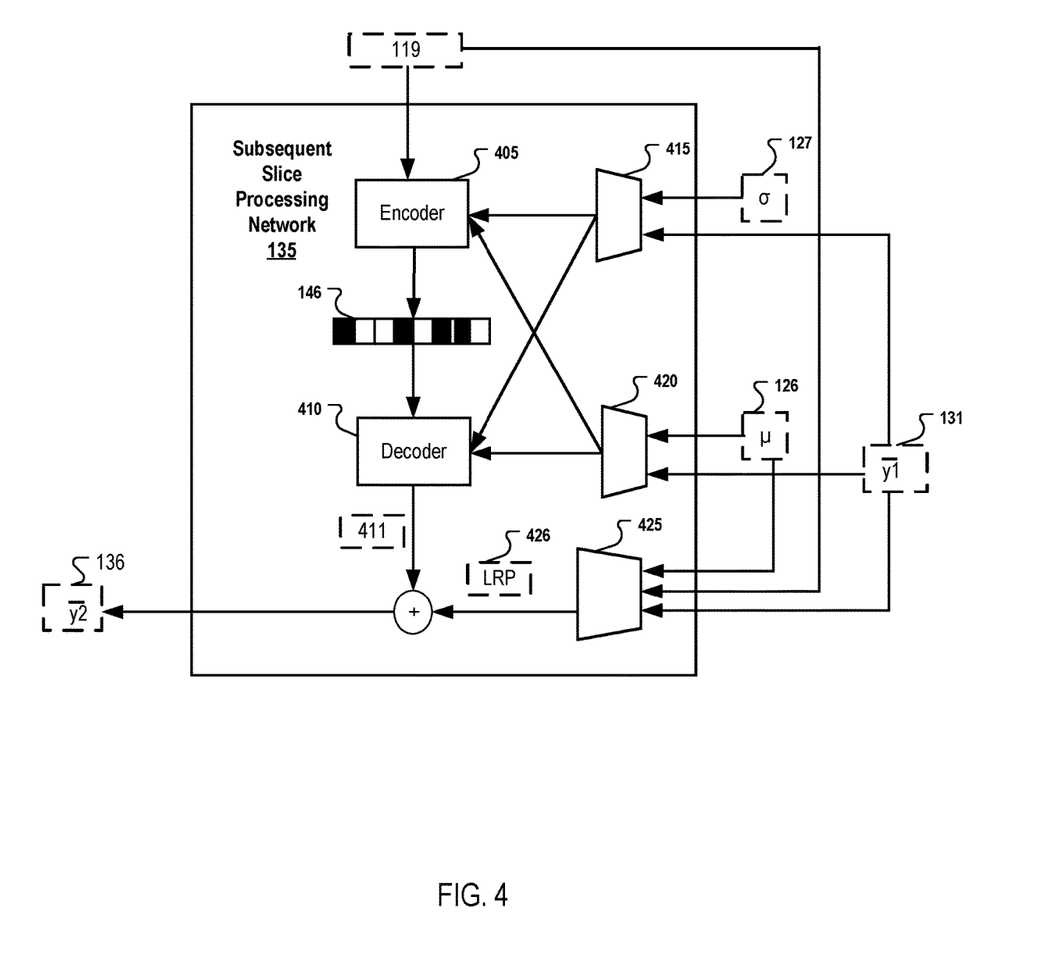
FIG. 4 is a block diagram of an example subsequent slice processing network.

FIG. 4 is a block diagram of an example subsequent slice processing network 135 used by the compression system 100. The subsequent slice processing network 130 includes (1) an entropy encoder 405, (2) an entropy decoder 410 and (3) two convolutional neural network blocks 415 and 420 that includes convolutional neural network layers, and (4) a latent residual prediction model 425.

In one example, the convolutional neural network block 415 within the subsequent slice processing network 135 is configured to receive as input, the hyperprior parameter sigma 127 ($\sigma$) that is generated by the hyperprior processing network 125 to generate as output, a representation of the hyperprior parameter sigma 127 ($\sigma$).

In another example, the convolutional neural network block 420 within the subsequent slice processing network 130 is configured to receive as input, the hyperprior parameter mu 126 ($\mu$) that is generated by the hyperprior processing network 125 to generate as output, a representation of the hyperprior parameter mu 126 ($\mu$).

The entropy encoder 405 within the subsequent slice processing network 135 compresses the second slice of the quantized latent representation of data 119 ($\overline{y2}$) using the representation of the hyperprior parameter sigma 127 ($\sigma$) and the representation of the hyperprior parameter mu 126 ($\mu$) to generate a compressed representation of the second slice 146. As mentioned before, the entropy encoder 405 can implement any appropriate entropy encoding technique, e.g., an arithmetic coding technique, a range coding technique, or a Huffman coding technique. The compressed representation of the first slice 146 may be represented in any of a variety of ways, e.g., as a bit string. In some implementations, the entropy encoder 405 within the subsequent slice processing network 135, prior to compressing the second slice of the quantized latent representation of data 118 ($\bar{y}2$) can subtract mu 126 (µ) from the second slice of the quantized latent representation of data 118 ($\bar{y}2$).

The latent residual prediction model 425 within the subsequent slice processing network 135 is configured to process the second slice of quantized latent representation of data 119 ($\bar{y}2$), the hyperprior parameter mu 126 (µ) and latent residual prediction (LRP) 326 of the first slice of quantized latent representation of data generated by the first slice processing network 130 to generate the latent residual prediction (LRP) 426 of the second slice of quantized latent representation of data.

In one example, the compressed representation of the first slice 146 is decoded using an entropy decoder 410 to generate a decoded representation 411 of the compressed representation of the first slice based on the hyperprior parameters mu 126 (µ) and sigma 127 (σ). The decoded representation 411 and the latent residual prediction (LRP) 426 is further combined (e.g., summed or concatenated) to generate a subsequent augmented slice 136 ($\bar{y}2$).

During decompression and since the decompression system receives only the compressed data, the latent residual prediction model 425 within the subsequent slice processing network 135 is configured to process the decoded representation 411 instead of the first slice of quantized latent representation of data 119 ($\bar{y}2$) to generate the latent residual prediction (LRP) 426 of the subsequent slice of quantized latent representation of data.

Continuing with FIG. 1, the compression system 100 compresses the input data 105 ($x$) to generate the compressed representation of the input data 140 by concatenating the compressed representation of the hyperprior parameters generated by the hyperprior processing network, the compressed representation of the first slice generated by the first slice processing network and the compressed representation of all the subsequent slices generated by the respective subsequent slice processing network.

For example, the compression system 100 generates by concatenating the compressed representation of the hyperprior parameters 142, the compressed representation of the first slice 144 and the compressed representation of the subsequent slice (in this case the second slice) to generate the compressed representation of the input data 140.

During decompression, the first augmented slice and the subsequent augmented slices are combined together to generate an augmented representation of the latent representation of the data that is provided as input to a decoder neural network 155. In this case, the first augmented slice 131 and the subsequent augmented slices 136 are combined together to generate an augmented representation of the latent representation 150. For implementations where the entropy encoder 305 and the entropy encoder 405 prior to compressing the respective slices of the quantized latent representation of data 118 ($\bar{y}1$) and 119 ($\bar{y}2$) subtracts mu 126 (µ) from the respective slices, the compression system 100 adds mu 126 (µ) to the augmented representation of the latent representation 150.

In one example, the decoder neural network 155 can include convolutional neural network layers. In another example, the decoder neural network 155 may be configured to receive as input, augmented representation of the latent representation of the data 150 and generate a decoded output 160 such that the input has a lower dimension than the decoded output 160.

The compression system and the decompression system can be jointly trained using machine learning training techniques (e.g., stochastic gradient descent) to optimize a rate-distortion objective function. The training process can user error metric such as mean squared error (MSE), mean absolute error (MAD), and multiscale structural similarity (MS-SSIM) or any differentiable loss function. The training process can also use adversarial loss (the adversary part of a GAN) or a perceptual metric (i.e., a learned metric) loss. More specifically, the first encoder neural network 110, the second-encoder neural network 120, the multiple convolutional neural network blocks 225, 230, 315, 320, 325, 415, 420, 425 and the decoder neural network 155 can be jointly trained to optimize the rate distortion objective function.

Figure 5:
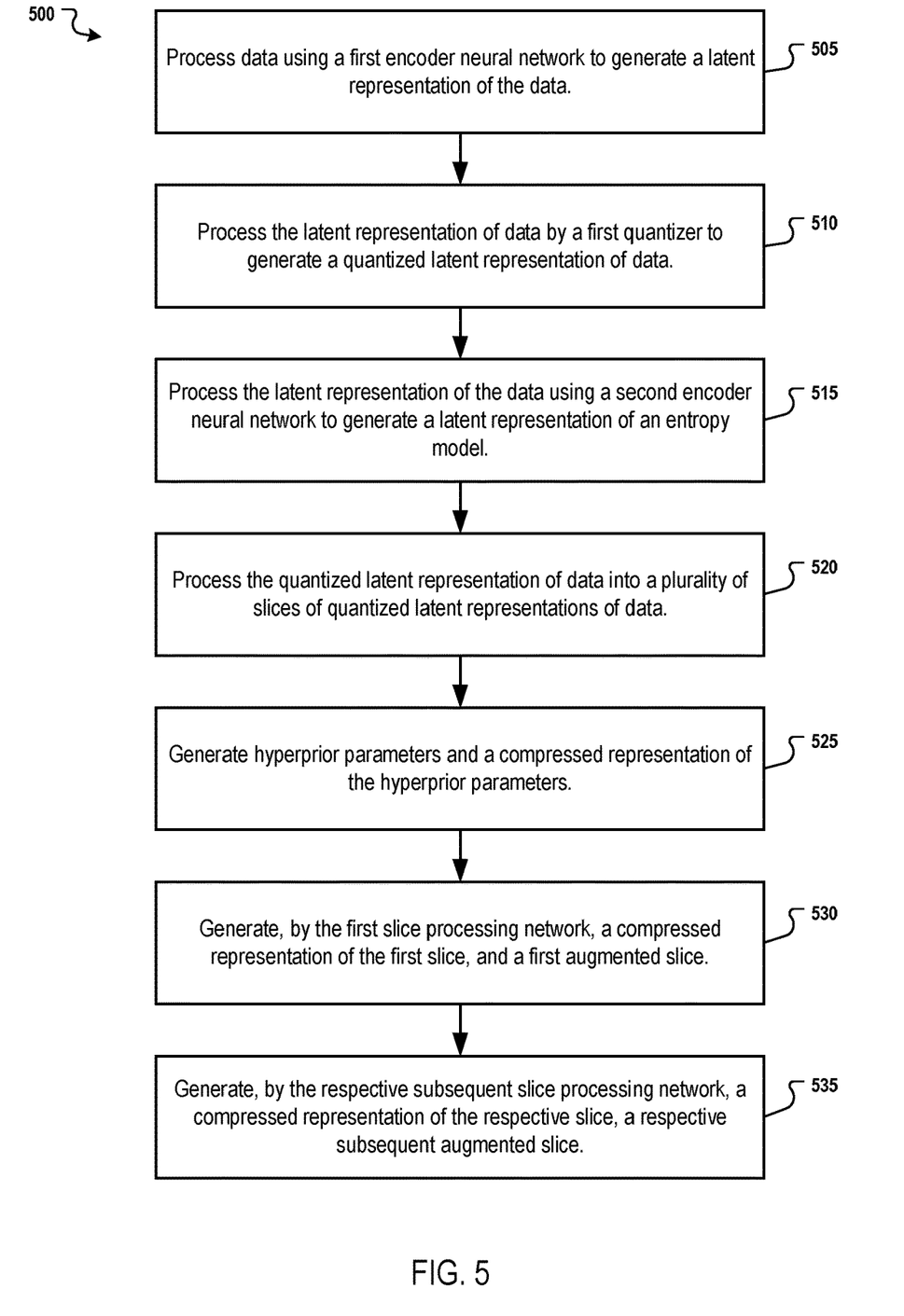
FIG. 5 is a flow diagram of an example process for compressing data.

FIG. 5 is a flow diagram of an example process 500 for compressing data. For convenience, the process 500 will be described as being performed by a system of one or more computers located in one or more locations. For example, a compression system, e.g., the compression system described with reference to FIG. 1, appropriately programmed in accordance with this specification, can perform the process 500.

The process 500 processes data using a first encoder neural network to generate a latent representation of the data (505). The compression system 100 includes a first encoder neural network that is configured to process the input data to generate a latent representation of the input data. A "latent representation" of data refers to a representation of the data as an ordered collection of numerical values, e.g., a vector or matrix of numerical values. For example, the first encoder neural network 110 is configured to process the input data 105 ($x$) to generate a latent representation 111 ($y$) of the input data 105.

In one example, the first encoder neural network 110 may be a convolutional neural network configured to process an input image to generate a latent representation 111 of the input data may be a multi-channel feature map output by the final layer of the first encoder neural network 110.

The process 500 processes the latent representation of data by a first quantizer to generate a quantized latent representation of data (505). The compression system 100 quantizes the latent representation 111 of the input data using a quantizer Q 115 to generate an ordered collection of code symbols 116 ($\hat{y}$) also referred to as quantized latent representation of data. Quantizing a value refers to mapping the value to a member of a discrete set of possible code symbols. For example, the set of possible code symbols may be integer values, and the compression system 100 may perform quantization by rounding real-valued numbers to integer values.

The process 500 processes the latent representation of the data using a second encoder neural network to generate a latent representation of an entropy model (515). The compression system 100 includes a second encoder neural network 120 that is configured to process the latent representation 111 of the input data to generate a latent representation of an entropy model 121 ($z$) (sometimes called a "hyper-parameter" or "hyperprior"). In one example, the second encoder neural network 120 may be a convolutional neural network, and the latent representation of an entropy model 121 ($z$) may be a multi-channel feature map output by the final layer of the second encoder neural network 120.

The process 500 processes the quantized latent representation of data into a plurality of slices of quantized latent representations of data (520). The quantized latent representation of data is processed into a plurality of slices of quantized latent representations of data such that each slice of quantized latent representation of data is different from the other slices of quantized latent representation of data. In one example, the slices of the quantized latent representation of data are arranged in an ordinal sequence.

For example, assume that the quantized latent representation of data is a matrix of dimension 600×200. Also assume that the number of slices as determined by the compression system configuration is 3. In such a scenario, one possible way of slicing the quantized latent representation of data is a matrix of size 600×200 is by generating three slices of dimension 200×200.

With reference to FIG. 1, the quantized latent representation of data 116($\hat{y}$) is processed into two slices: (1) a first slice of quantized latent representation of data 118 ($\overline{y1}$), and (2) a second slice of quantized latent representation of data 119 ($\overline{y2}$).

The process 500 generates hyperprior parameters and a compressed representation of the hyperprior parameters (525). The compression system 100 includes a hyperprior processing network 125 that is configured to receive as input the latent representation of the entropy model 121 (z) and generate as output hyperprior parameters mu 126 ($\mu$) and sigma 127 ($\sigma$) that represents the probability distribution of the entropy model 121 (z) and a compressed representation of the hyperprior parameters 142.

In one example, the second quantizer 205 within the hyperprior processing network 125 is configured to quantize the latent representation of an entropy model 121 (z) and generate a quantized representation of the latent representation of the entropy model 206 ($\hat{z}$) which is an ordered collection of code symbols representing the latent representation of an entropy model 121 (z). The entropy encoder 210 within the hyperprior processing network 125 then compresses the quantized representation of the latent representation of the entropy model 206 ($\hat{z}$) using a predetermined entropy model 215 that specifies one or more predetermined code symbol probability distributions to generate a compressed representation of the hyperprior parameters 142.

The entropy decoder 220 within the hyperprior processing network 125 is configured to process the compressed representation of the hyperprior parameters 142 to generate a decoded representations of the hyperprior parameters. The decoded representations of the hyperprior parameters is further provided as input to convolutional neural network blocks to generate the hyperprior parameters. For example, the decoded representations of the hyperprior parameters is provided as input to two convolutional neural network blocks 225 and 230 that generates the probability distribution parameters mu 126 ($\mu$) and sigma 127 ($\sigma$).

The process 500 generates, by the first slice processing network, a compressed representation of the first slice, and a first augmented slice (530). As mentioned with reference with FIG. 1, the first slice processing network 130 is configured to receive as input the hyperprior parameters (mu and sigma) representing the probability distribution of the entropy model generated using the hyperprior processing network 125 and the first slice of quantized latent representation of data 118 ($\overline{y1}$) and generate a compressed representation of the first slice 144, and a first augmented slice 131.

As mentioned with reference to FIG. 3, the convolutional neural network block 315 is configured to receive as input, the hyperprior parameter sigma 127 ($\sigma$) to generate as output, a representation of the hyperprior parameter sigma 127 ($\sigma$). Also the convolutional neural network block 320 is configured to receive as input, the hyperprior parameter mu 126 ($\mu$) to generate as output, a representation of the hyperprior parameter mu 126 ($\mu$). The entropy encoder 305 compresses the first slice of the quantized latent representation of data 118 ($\overline{y1}$) using the representation of the hyperprior parameter sigma 127 ($\sigma$) and the representation of the hyperprior parameter mu 126 ($\mu$) to generate a compressed representation of the first slice 144.

The latent residual prediction model 325 within the first slice processing network 130 is configured to process the first slice of quantized latent representation of data 118 ($\overline{y1}$) and the hyperprior parameters mu 126 ($\mu$) to generate the latent residual prediction (LRP) 326 that is combined to a decoded representation 311 of the compressed representation of the first slice using an entropy decoder 310 based on the hyperprior parameters mu 126 ($\mu$) and sigma 127 ($\sigma$) to generate a first augmented slice 131 ($\overline{y1}$).

The process 500 generates, by the respective subsequent slice processing network, a compressed representation of the respective slice, a respective subsequent augmented slice (535). The subsequent slice processing network 135 is configured to receive as input the hyperprior parameters (mu and sigma), the subsequent slice of quantized latent representation of data which in this case is the second slice 119 ($\overline{y2}$) and an augmented slice generated by a prior subsequent slice processing network which in this case is the first augmented slice 131 ($\overline{y1}$) and generate as output a compressed representation of the second slice 146, and a subsequent augmented slice 136.

The convolutional neural network block 415 is configured to receive as input, the hyperprior parameter sigma 127 ($\sigma$) to generate as output, a representation of the hyperprior parameter sigma 127 ($\sigma$). The convolutional neural network block 420 is configured to receive as input, the hyperprior parameter mu 126 ($\mu$) to generate as output, a representation of the hyperprior parameter mu 126 ($\mu$).

The entropy encoder 405 compresses the second slice of the quantized latent representation of data 119 ($\overline{y2}$) using the representation of the hyperprior parameter sigma 127 ($\sigma$) and the representation of the hyperprior parameter mu 126 ($\mu$) to generate a compressed representation of the second slice 146.

The latent residual prediction model 425 is configured to process the second slice of quantized latent representation of data 119 ($\overline{y2}$), the hyperprior parameter mu 126 ($\mu$) and latent residual prediction (LRP) 326 of the first slice of quantized latent representation of data to generate the latent residual prediction (LRP) 426 of the second slice of quantized latent representation of data that is combined with a decoded representation 411 generated using an entropy decoder 410 based on the hyperprior parameters mu 126 ($\mu$) and sigma 127 ($\sigma$).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificiallygenerated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML, page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
processing data using a first encoder neural network to generate a latent representation of the data;
processing the latent representation of data, comprising:
processing the latent representation of data by a first quantizer to generate a quantized latent representation of data; and
processing the latent representation of the data using a second encoder neural network to generate a latent representation of an entropy model, wherein the entropy model is defined by one or more probability distribution parameters characterizing one or more code symbol probability distributions;
processing the quantized latent representation of data into a plurality of slices of quantized latent representations of data, wherein each slice of quantized latent representation of data is different from each other slice of quantized latent representation of data, and the slices are arranged in an ordinal sequence;
generating, by a hyperprior processing network and from the latent representation of the entropy model, hyperprior parameters representing the probability distribution of the entropy model and a compressed representation of the hyperprior parameters;
providing the hyperprior parameters as input to a plurality of slice processing networks, wherein each slice processing network also receives as input one of the slices of quantized latent representations of data and generates a compressed representation of the slice that is received as input based at least on the slice as received as input and the hyperprior parameters;
wherein a combination of the compressed representation of the slices received as input form a compressed representation of the data.

2. The method of claim 1, wherein generating, by the hyperprior processing network and from the latent representation of the entropy model, the hyperprior parameters comprises:
processing the latent representation of the entropy model using a second quantizer to generate a quantized representation of the latent representation of the entropy model;
processing the quantized representation of the latent representation of the entropy model using an encoder and based on a predetermined entropy model that specifies one or more predetermined probability distributions to generate a compressed representation of the hyperprior parameters;
processing the compressed representation of the hyperprior parameters using a decoder to generate a decoded representations of two or more hyperprior parameters;
processing each of the decoded representation of two or more hyperprior parameters using a corresponding decoder neural network to generate the two or more hyperprior parameters.

3. The method of claim 1, wherein the data comprises an image.

4. The method of claim 1, wherein the first and the second encoder neural network comprises convolution neural network layers.

5. The method of claim 1, wherein:
a first slice processing network of the plurality of slice processing networks generates a first augmented slice that represents the first slice of quantized latent representation of data and a latent residual prediction that is a prediction of a residual encoding and decoding error based on the hyperprior parameters and provides the first augmented slice to a subsequent slice processing network.

6. The method of claim 5, wherein:
each slice processing networks subsequent to the first slice processing network receives a respective subsequent augmented slice from a prior slice processing network and generates a respective subsequent augmented slice that represents the respective subsequent slice of quantized latent representation of data and a respective latent residual prediction that is a prediction of a residual encoding and decoding error based on the hyperprior parameters and each prior subsequent augmented slice.

7. A system, comprising:
a data processing apparatus; and
a non-transitory computer readable medium in data communication with the data processing apparatus and storing instructions executable by the data processing apparatus and that upon such execution cause the data processing apparatus to perform operations comprising:
processing data using a first encoder neural network to generate a latent representation of the data;
processing the latent representation of data, comprising:
processing the latent representation of data by a first quantizer to generate a quantized latent representation of data; and
processing the latent representation of the data using a second encoder neural network to generate a latent representation of an entropy model, wherein the entropy model is defined by one or more probability distribution parameters characterizing one or more code symbol probability distributions;
processing the quantized latent representation of data into a plurality of slices of quantized latent representations of data, wherein each slice of quantized latent representation of data is different from each other slice of quantized latent representation of data, and the slices are arranged in an ordinal sequence;

generating, by a hyperprior processing network and from the latent representation of the entropy model, hyperprior parameters representing the probability distribution of the entropy model and a compressed representation of the hyperprior parameters;

providing the hyperprior parameters as input to a plurality of slice processing networks, wherein each slice processing network also receives as input one of the slices of quantized latent representations of data and generates a compressed representation of the slice that is received as input based at least on the slice as received as input and the hyperprior parameters;

wherein a combination of the compressed representation of the slices received as input form a compressed representation of the data.

8. The system of claim 7, wherein generating, by the hyperprior processing network and from the latent representation of the entropy model, the hyperprior parameters comprises:

processing the latent representation of the entropy model using a second quantizer to generate a quantized representation of the latent representation of the entropy model;

processing the quantized representation of the latent representation of the entropy model using an encoder and based on a predetermined entropy model that specifies one or more predetermined probability distributions to generate a compressed representation of the hyperprior parameters;

processing the compressed representation of the hyperprior parameters using a decoder to generate a decoded representations of two or more hyperprior parameters;

processing each of the decoded representation of two or more hyperprior parameters using a corresponding decoder neural network to generate the two or more hyperprior parameters.

9. The system of claim 7, wherein the data comprises an image.

10. The system of claim 7, wherein the first and the second encoder neural network comprises convolution neural network layers.

11. The system of claim 10, wherein:

a first slice processing network of the plurality of slice processing networks generates a first augmented slice that represents the first slice of quantized latent representation of data and a latent residual prediction that is a prediction of a residual encoding and decoding error based on the hyperprior parameters and provides the first augmented slice to a subsequent slice processing network.

12. The system of claim 11, wherein:

each slice processing networks subsequent to the first slice processing network receives a respective subsequent augmented slice from a prior slice processing network and generates a respective subsequent augmented slice that represents the respective subsequent slice of quantized latent representation of data and a respective latent residual prediction that is a prediction of a residual encoding and decoding error based on the hyperprior parameters and each prior subsequent augmented slice.

13. A non-transitory computer readable medium storing instructions that, when executed by one or more data processing apparatus, cause the one or more data processing apparatus to perform operations comprising:

processing data using a first encoder neural network to generate a latent representation of the data;

processing the latent representation of data, comprising:
processing the latent representation of data by a first quantizer to generate a quantized latent representation of data; and processing the latent representation of the data using a second encoder neural network to generate a latent representation of an entropy model, wherein the entropy model is defined by one or more probability distribution parameters characterizing one or more code symbol probability distributions;

processing the quantized latent representation of data into a plurality of slices of quantized latent representations of data, wherein each slice of quantized latent representation of data is different from each other slice of quantized latent representation of data, and the slices are arranged in an ordinal sequence;

generating, by a hyperprior processing network and from the latent representation of the entropy model, hyperprior parameters representing the probability distribution of the entropy model and a compressed representation of the hyperprior parameters;

providing the hyperprior parameters as input to a plurality of slice processing networks, wherein each slice processing network also receives as input one of the slices of quantized latent representations of data and generates a compressed representation of the slice that is received as input based at least on the slice as received as input and the hyperprior parameters;

wherein a combination of the compressed representation of the slices received as input form a compressed representation of the data.

14. The non-transitory computer readable medium of claim 13, wherein generating, by the hyperprior processing network and from the latent representation of the entropy model, the hyperprior parameters comprises:

processing the latent representation of the entropy model using a second quantizer to generate a quantized representation of the latent representation of the entropy model;

processing the quantized representation of the latent representation of the entropy model using an encoder and based on a predetermined entropy model that specifies one or more predetermined probability distributions to generate a compressed representation of the hyperprior parameters;

processing the compressed representation of the hyperprior parameters using a decoder to generate a decoded representations of two or more hyperprior parameters;

processing each of the decoded representation of two or more hyperprior parameters using a corresponding decoder neural network to generate the two or more hyperprior parameters.

15. The non-transitory computer readable medium of claim 13, wherein the data comprises an image.

16. The non-transitory computer readable medium of claim 13, wherein the first and the second encoder neural network comprises convolution neural network layers.

17. The non-transitory computer readable medium of claim 16, wherein:

a first slice processing network of the plurality of slice processing networks generates a first augmented slice that represents the first slice of quantized latent representation of data and a latent residual prediction that is a prediction of a residual encoding and decoding error based on the hyperprior parameters and provides the first augmented slice to a subsequent slice processing network.

18. The non-transitory computer readable medium of claim 17, wherein:
   each slice processing networks subsequent to the first slice processing network receives a respective subsequent augmented slice from a prior slice processing network and generates a respective subsequent augmented slice that represents the respective subsequent slice of quantized latent representation of data and a respective latent residual prediction that is a prediction of a residual encoding and decoding error based on the hyperprior parameters and each prior subsequent augmented slice.

* * * * *